United States Patent
Watanabe

(10) Patent No.: US 11,505,104 B2
(45) Date of Patent: Nov. 22, 2022

(54) SEAT

(71) Applicant: TS TECH CO., LTD., Asaka (JP)

(72) Inventor: Masato Watanabe, Shioya-gun (JP)

(73) Assignee: TS TECH CO., LTD., Asaka (JP)

(\*) Notice: Subject to any disclaimer, the term of this patent is extended or adjusted under 35 U.S.C. 154(b) by 260 days.

(21) Appl. No.: 16/898,664

(22) Filed: Jun. 11, 2020

(65) Prior Publication Data

US 2020/0391638 A1    Dec. 17, 2020

Related U.S. Application Data

(60) Provisional application No. 62/859,942, filed on Jun. 11, 2019.

(51) Int. Cl.
  *B60N 2/20* (2006.01)
  *B60N 2/22* (2006.01)
  *B60N 2/90* (2018.01)
  *A47C 7/14* (2006.01)

(52) U.S. Cl.
  CPC ............... *B60N 2/933* (2018.02); *A47C 7/14* (2013.01); *B60N 2/2222* (2013.01)

(58) Field of Classification Search
  CPC .................................. B60N 2/20; B60N 2/206
  USPC ....................................... 297/378.12, 378.14
  See application file for complete search history.

(56) References Cited

U.S. PATENT DOCUMENTS

| | | | | |
|---|---|---|---|---|
| 7,556,315 B2* | 7/2009 | Nathan | ................ | B60N 2/0224 297/378.12 |
| 7,775,594 B2* | 8/2010 | Bruck | ...................... | B60N 2/20 297/378.12 |
| 8,123,272 B2* | 2/2012 | Ito | ........................ | B60N 2/3011 297/378.12 X |
| 8,141,954 B2* | 3/2012 | Kumazaki | ................ | B60N 2/12 297/378.12 |
| 8,231,176 B2* | 7/2012 | Mitsuhashi | .......... | B60N 2/2356 297/378.12 |
| 8,282,160 B2* | 10/2012 | Lutzka | ................... | B60N 2/206 297/378.12 |
| 8,360,528 B2* | 1/2013 | Shinohara | .......... | B60N 2/01583 297/378.12 X |
| 8,864,224 B2* | 10/2014 | Kobayashi | ........... | B60N 2/3011 297/378.12 |
| 8,985,691 B2* | 3/2015 | Tsuruta | ................ | B60N 2/2356 297/378.12 X |

FOREIGN PATENT DOCUMENTS

JP    H03-060545 A    3/1991

\* cited by examiner

*Primary Examiner* — Rodney B White
(74) *Attorney, Agent, or Firm* — Oliff PLC

(57) ABSTRACT

Disclosed is a seat including: a seat back; a seat cushion; and a reclining device that couples the seat back to the seat cushion in a swingable manner in one and another directions, wherein the reclining device includes: a locking mechanism that locks and unlocks swinging movement of the seat back; a biasing member that biases the seat back in one direction so as to swing the seat back in the one direction when the locking mechanism is unlocked; and a switching mechanism that switches a biasing direction of the biasing member for the seat back to another direction in a middle of the swinging movement of the seat back.

14 Claims, 9 Drawing Sheets

FIG.9
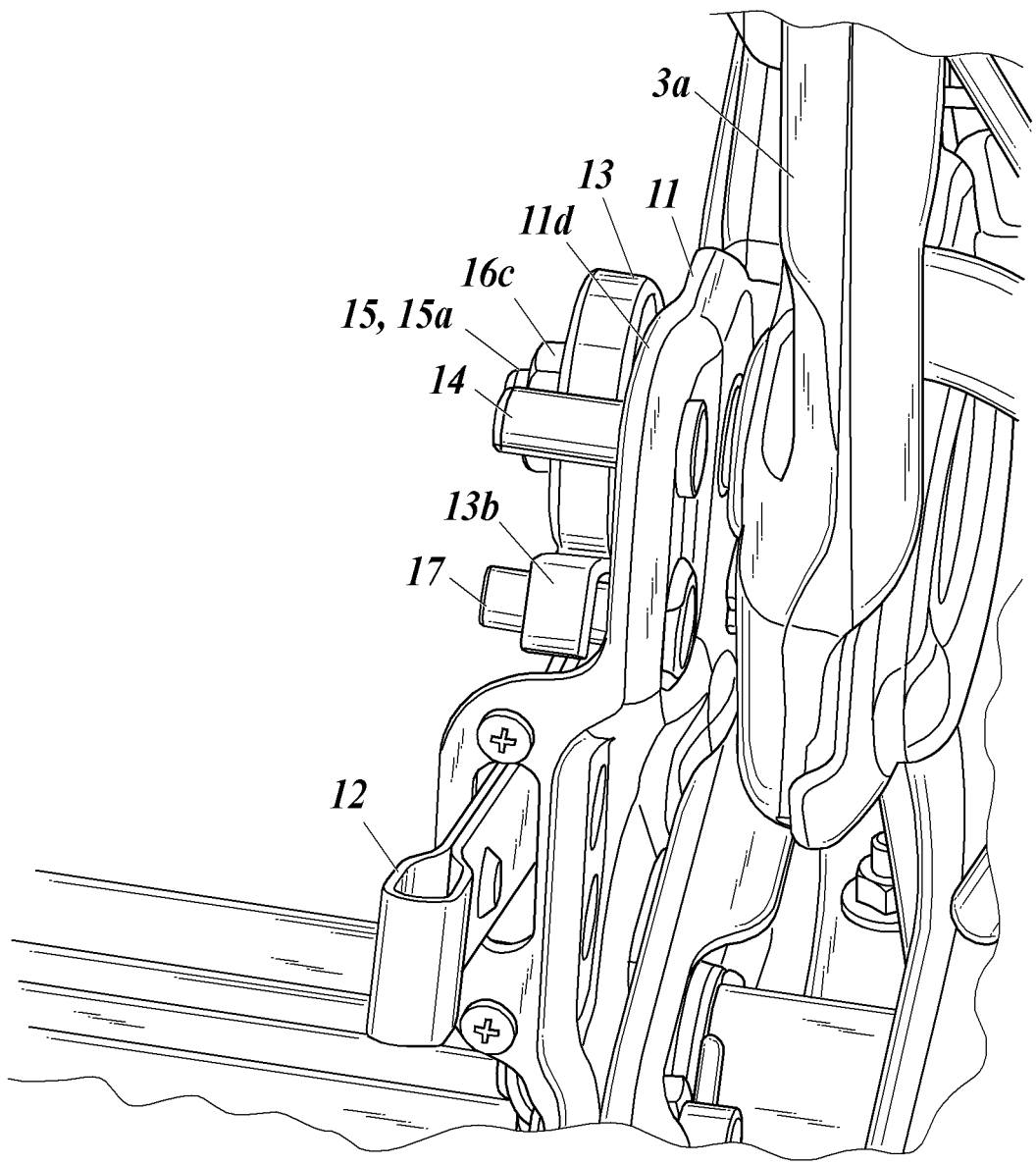
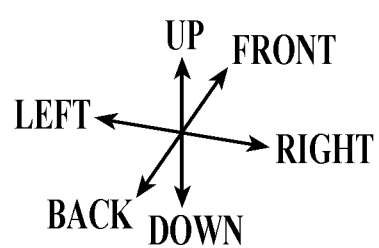

FIG.10
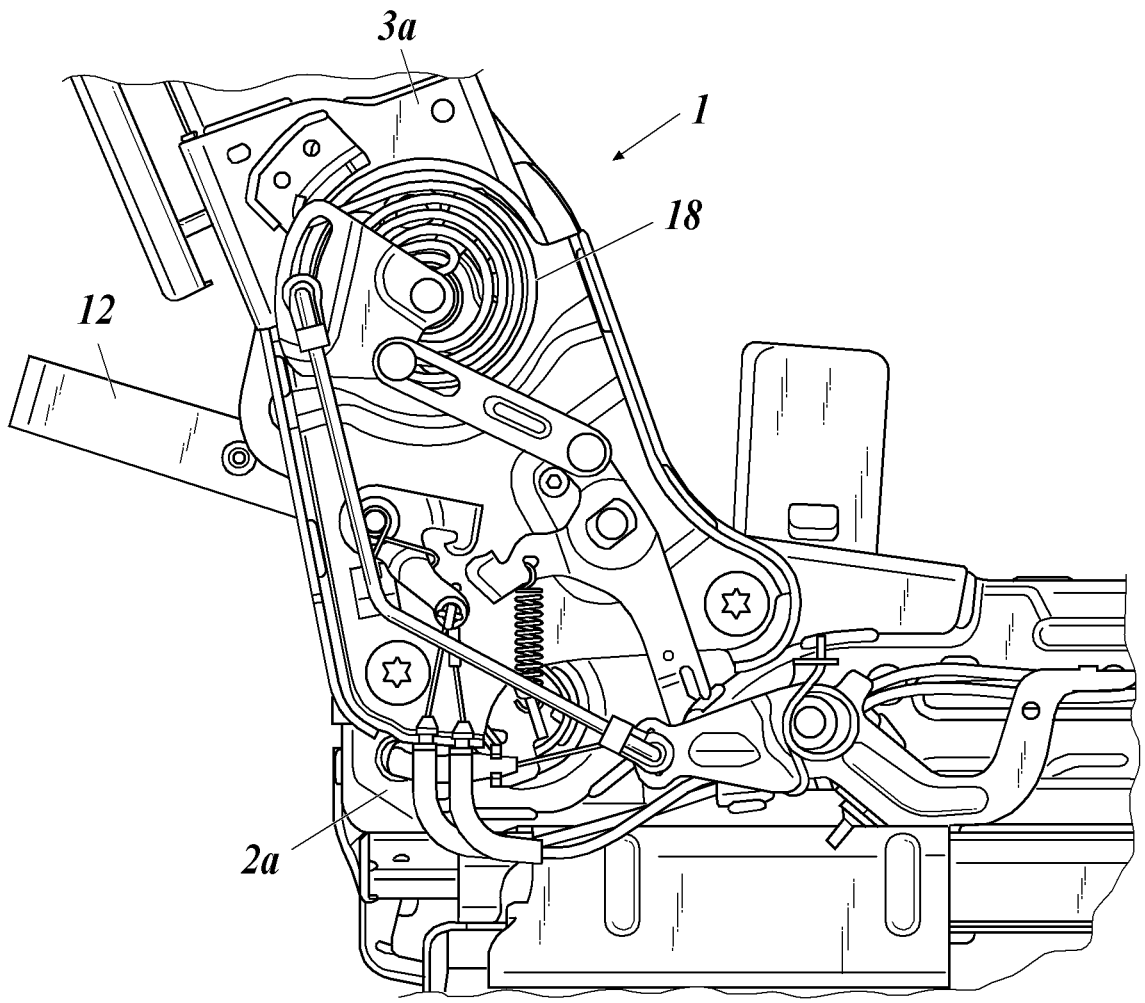
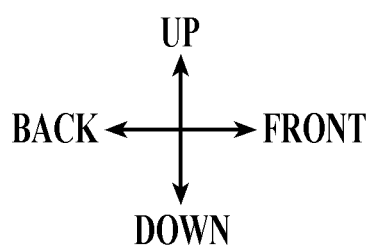

SEAT

CROSS-REFERENCE TO RELATED APPLICATION

This application is based upon and claims the benefit of priority from the U.S. Provisional Patent Application No. 62/859,942, filed on Jun. 11, 2019, the entire contents of which are incorporated herein by reference.

BACKGROUND

1. Technical Field

The present invention relates to a seat with a reclining device.

2. Description of Related Art

Seats with a reclining device that allows a seat back to swing forward and backward with respect to a seat cushion and that biases the seat back to swing forward have been widely known.

For example, a seat described in Patent Document 1 (JP H03-60545A) is provided with a reclining device in which a return spring for constantly biasing a seat back forward is configured not to apply its biasing force over a standing position of the seat back. This configuration can moderate the speed of the seat back swinging forward and thereby improve the safety.

SUMMARY

However, the reclining device of Patent Document 1 requires various parts for achieving the configuration that the forward biasing force is not applied over the standing position of the seat back. This results in a complex structure of the reclining device.

It is an object of the present invention to provide a seat with a reclining device that has a reduced number of parts and can moderate the forward swinging speed of the seat back with a simple structure.

According to a first aspect of the present invention, a seat comprises: a seat back; a seat cushion; and a reclining device that couples the seat back to the seat cushion in a swingable manner in one and another directions,
  wherein the reclining device includes:
  a locking mechanism that locks and unlocks swinging movement of the seat back;
  a biasing member that biases the seat back in one direction so as to swing the seat back in the one direction when the locking mechanism is unlocked; and
  a switching mechanism that switches the biasing direction of the biasing member for the seat back to another direction in a middle of the swinging movement of the seat back.

BRIEF DESCRIPTION OF THE DRAWINGS

The objects, advantageous effects and features of the present invention will become fully understood by the following detailed description and the accompanying drawings, however they are not intended to limit the scope of the present invention, wherein:

FIG. 9 is a rear perspective view of the main part of the reclining device;

FIG. 10 is a side view of a spiral spring that is disposed on the right side surface of the seat;

DESCRIPTION OF EMBODIMENTS

Figure 1:
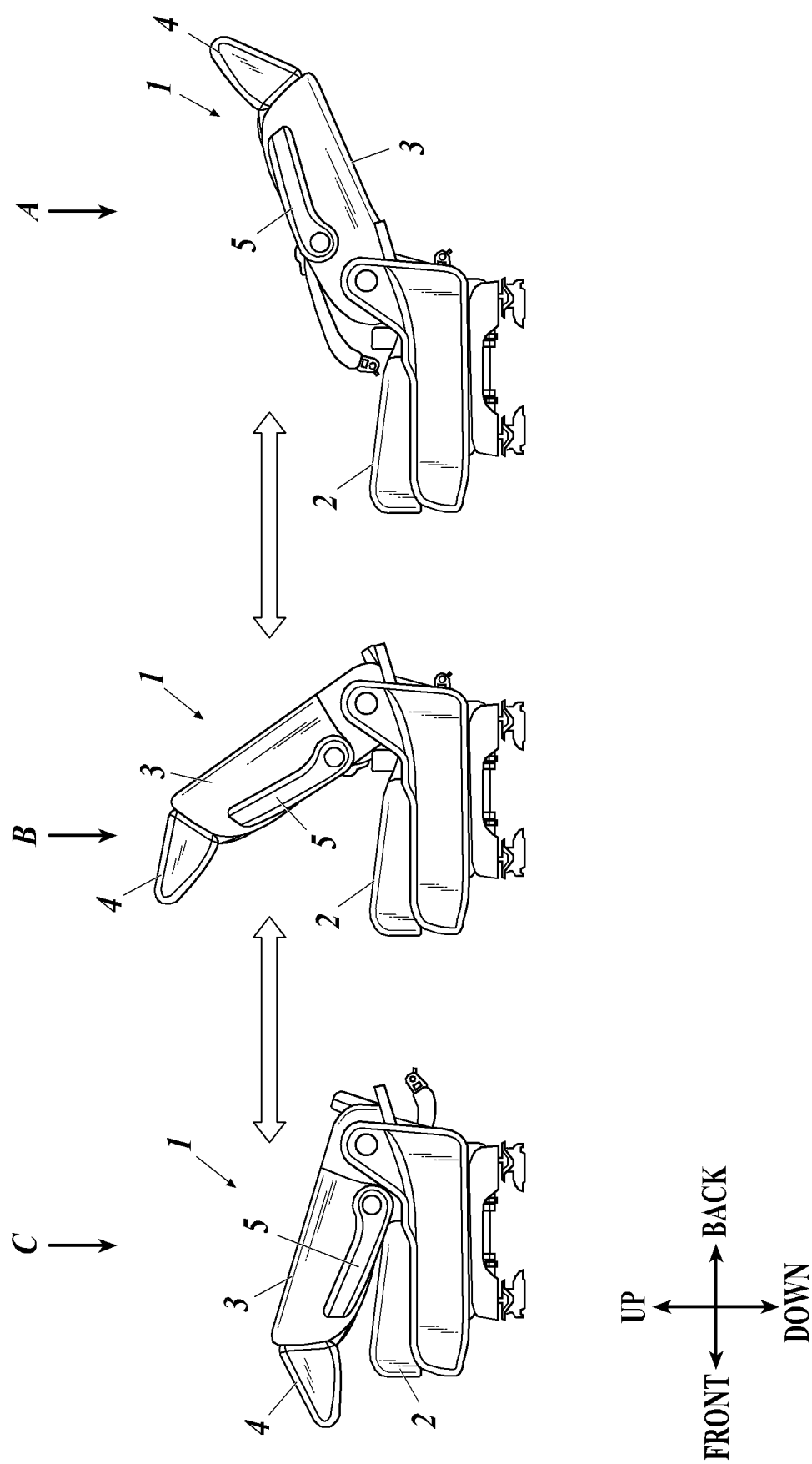
FIG. 1 is a schematic view illustrating swinging movement of a seat back.

Hereinafter, an embodiment of the present invention will be described referring to the drawings. While the following description includes a variety of limitations that are preferred for carrying out the present invention, the technical scope of the present invention is not limited to the following embodiment and the illustrated examples.

FIG. 1 is a schematic view illustrating swinging movement of a seat 1 of the embodiment. The seat 1 is installed in a vehicle such as an automobile and is used for an occupant to sit therein.

The seat 1 includes a seat cushion 2 for supporting the hip and sighs of the occupant, a seat back 3 as a backrest, a head rest 4 for supporting the head of the occupant, and an arm rest 5 for supporting the arm of the occupant.

The seat 1 further includes a reclining device 10 that couples the seat back 3 to the seat cushion 2 in a swingable manner in one (forward in the embodiment) and the other (backward in the embodiment) directions. This allows the swinging movement of the seat 1 as illustrated in FIG. 1 from the position A in which the seat back 3 is reclined backward to the position C in which the seat back 3 is folded forward.

The seat cushion 2 includes a seat cushion frame 2a that is covered with a seat cushion pad of a cushioning material such as urethane foam and a covering material such as synthetic leather or fabric.

The seat back 3 includes a seat back frame 3a that is covered with a seat back pad of a cushioning material and a covering material.

As described above, the seat cushion 2 and the seat back 3 are coupled to each other by the reclining device 10. In more detail, the seat cushion frame 2a of the seat cushion 2 and the seat back frame 3a of the seat back 3 are coupled to each other by the reclining device 10.

The reclining device 10 includes a coupling member 11, a locking mechanism 12, a biasing member 13 and a switching mechanism 14.

The coupling member 11 is disposed at the end of the seat cushion 2 where the seat back 3 is supported to couple the seat cushion 2 to the seat back 3. In more detail, the coupling member 11 is constituted by a metal plate that is disposed over a rear end of the seat cushion frame 2a and a lower end of the seat back frame 3a.

An upper end of the coupling member 11 is connected to the lower end of the seat back frame 3a via a rotation shaft 15, and a lower end of the coupling member 11 is connected to the rear end of the seat cushion frame 2a at two points. The coupling member 11 is located at an outer side of the seat cushion frame 2a and the seat back frame 3a in the seat width direction.

The rotation shaft 15, which rotates integrally with the seat back 3, is inserted in a through hole (not shown in the figures) at the lower end of the seat back frame 3a and a through hole 11a at the upper end of the coupling member 11 so as to connect the lower end of the seat back frame 3a to the upper end of the coupling member 11.

Figure 8:
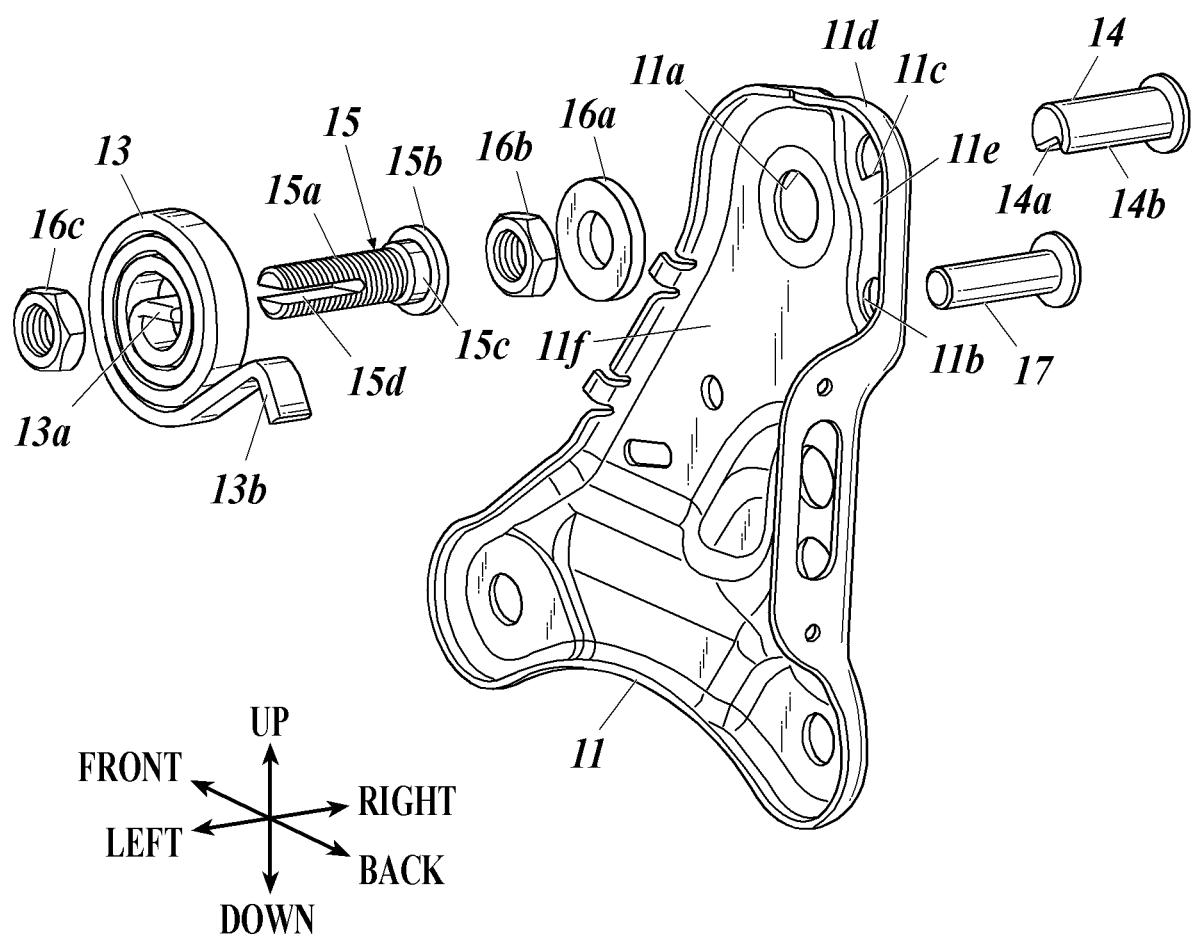
FIG. 8 is an exploded perspective view of the main part of the reclining device.

As illustrated in FIG. 8, the rotation shaft 15 includes a shaft body 15a that is inserted in the through holes and a flange 15b having a larger diameter than the shaft body 15a.

The shaft body 15a includes a bolt portion that has a male thread on the outer surface, and a smooth portion 15c that has a diameter of greater than the bolt portion and less than the flange 15b and has a smooth surface with no male thread.

The bolt portion of the shaft body 15a is bi-forked from the other end from the flange 15a to approximately a center in the longitudinal direction. The bolt portion thus has a slit 15d.

The shaft body 15a is inserted in the through hole of the seat back frame 3a and the through hole 11a of the coupling member 11 from the inner side of the seat back frame 3a.

When the shaft body 15a is inserted in the through holes, the flange 15b is in contact with the inner surface of the seat back frame 3a. Further, the smooth portion 15c of the shaft body 15a is at a position corresponding to the through hole of the seat back frame 3a and the through hole 11a of the coupling member 11.

A washer 16a and then a nut 16b with a female thread on the inner surface are provided on the shaft body 15a that is inserted in the through hole 11a of the coupling member 11. Accordingly, the rotation shaft 15 connects the seat back frame 3a to the coupling member 11.

As described later, an inner end of a spiral spring 13 as the biasing member 13 is inserted in the slit 15d of the shaft body 15a. Further, a nut 16c with a female thread on the inner surface is provided from the outer side.

In the embodiment, the flange 15b is joined to the inner surface of the seat back frame 3a by welding or the like so that the rotation shaft 15 rotates integrally with the seat back 3. However, the configuration is not limited thereto. The through hole of the seat back frame 3a and the smooth portion 15c may have a non-circular shape so that the rotation shaft 15 rotates integrally with the seat back 3.

Figure 2:
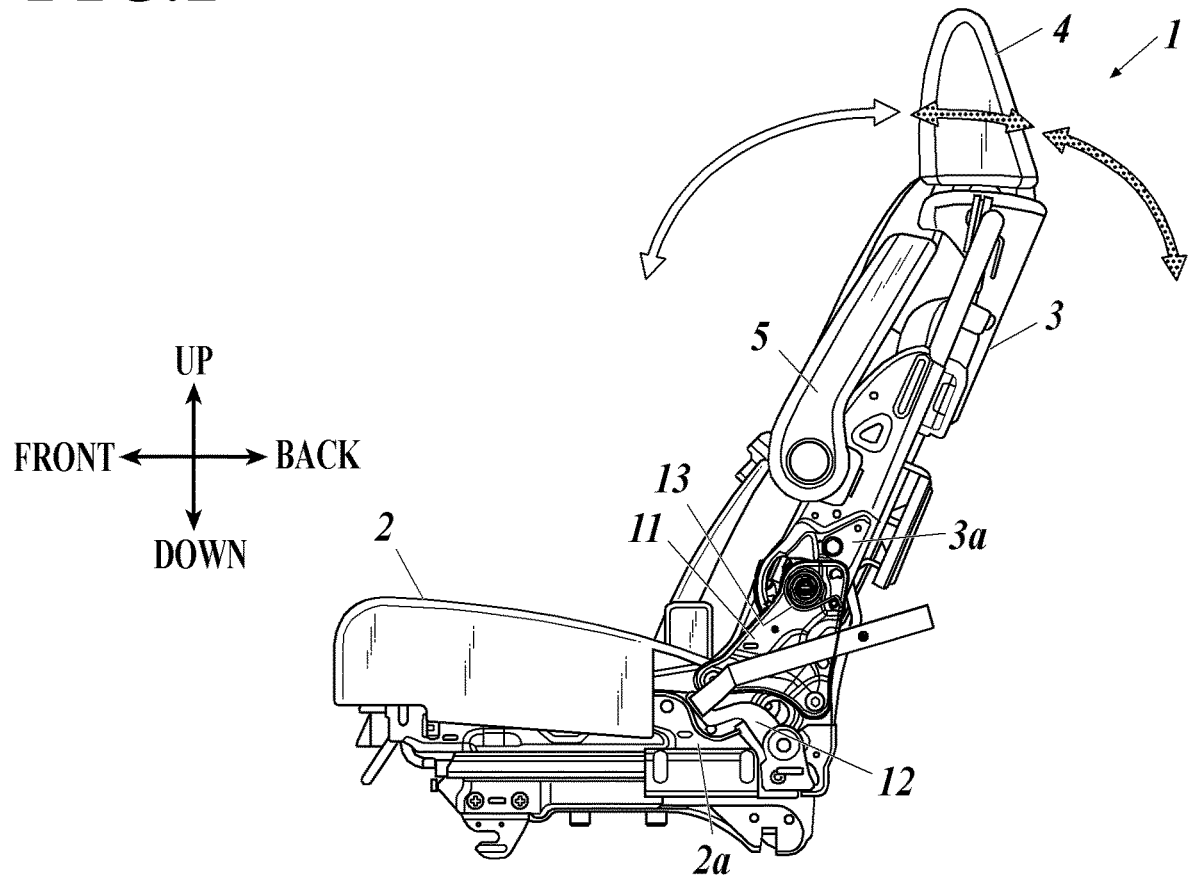
FIG. 2 is a left side view illustrating the state of the seat back when the biasing force of a spiral spring acts forward.
Figure 4:
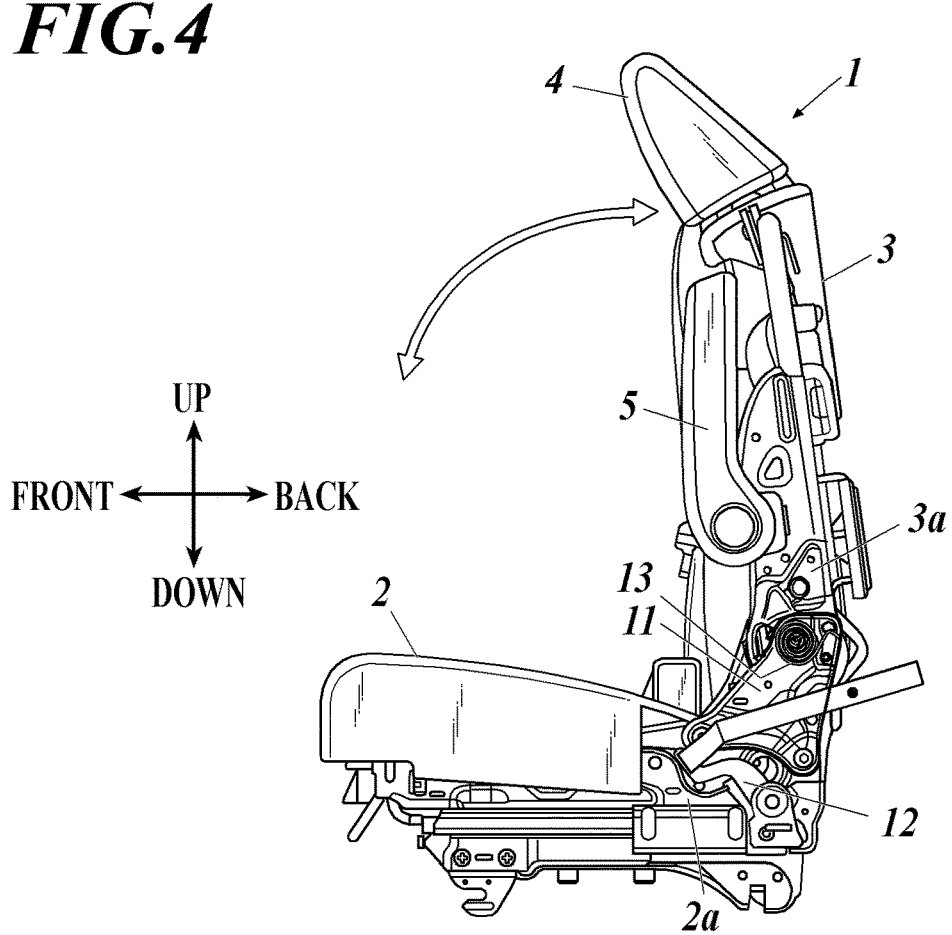
FIG. 4 is a left side view illustrating the state of the seat back when the biasing force of the spiral spring acts backward.

The locking mechanism 12 is provided to lock or unlock the swinging movement of the seat back 3. As illustrated in FIG. 2 and FIG. 4, the locking mechanism 12 is disposed near the coupling member 11.

The locking mechanism 12 of the embodiment can switch between a locked state and an unlocked state according to a lever operation.

Figure 3:
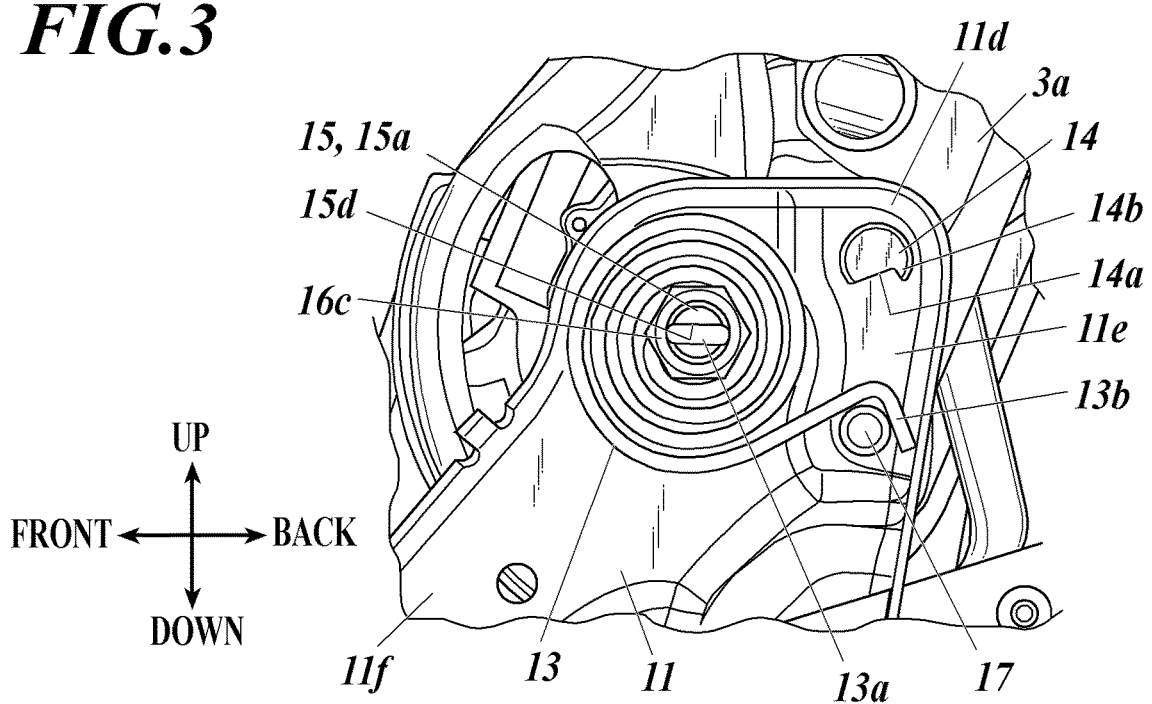
FIG. 3 is an enlarged view illustrating the state of the spiral spring when the biasing direction is forward.

The biasing member 13 biases the seat back 3 in one (forward) direction. When the locking mechanism 12 is unlocked, the biasing member 13 swings the seat back 3 in the one (forward) direction. The biasing member 13 of the embodiment is constituted by a spiral spring with an inner end 13a and an outer end 13b as illustrated in FIG. 3 and the like.

The spiral spring 13 is wound anticlockwise from the inner end 13a to the outer end 13b in a left side view of the seat 1. Further, the spiral spring 13 is a non-contacting spiral spring in which the metal component of the spiral spring 13 does not contact itself in the radial direction.

The spiral spring 13 has a circular and swirly shape as a whole. However, the inner end 13a of the spiral spring 13 is folded into a cornered shape corresponding to the slit 15d of the rotation shaft 15 as illustrated in FIG. 8.

Further, the outer end 13b of the spiral spring 13 extends outward with respect to the spiral of the spiral spring 13 itself and is folded further outward into a hook shape.

The inner end 13a of the spiral spring 13 is inserted in the slit 15d of the rotation shaft 15, and the nut 16c is disposed on the shaft body 15a of the rotation shaft 15. The spiral spring 13 can be thus attached to the rotation shaft 15. In more detail, the spiral spring 13 is disposed between the inner nut 16b and the outer nut 16c on the rotation shaft 15 of the coupling member 11. In other words, the spiral spring 13 as the biasing member is supported by the coupling member 11 and also held by the rotation shaft 15.

The outer end 13b of the spiral spring 13 is hooked on a pin member 17 that protrudes outward from the coupling member 11.

As illustrated in FIG. 8, the pin member 17 includes a cylindrical body and a flange head.

The coupling member 11 has a through hole 11b in which the pin member 17 is inserted. The pin member 17 is inserted in the through hole 11b from the inner side to the outer side of the coupling member 11. As illustrated in FIG. 9, the flange head is welded on the inner surface of the coupling member 11. The pin member 17 is thus attached to the coupling member 11. In other words, the coupling member 11 supports the pin member 17.

The switching mechanism 14 is provided to switch the biasing direction of the spiral spring 13 as the biasing member for the seat back 3 to the other (backward) direction in the middle of the swinging movement of the seat back 3. As illustrated in FIG. 3 and the like, the switching mechanism 14 is formed in a pin shape that protrudes from the coupling member 11.

In more detail, the switching mechanism 14 includes a stopper member that comes in contact with the outer end of the spiral spring 13 in the middle of the swinging movement of the seat back 3 in one (forward) direction so as to switch the biasing direction for the seat back 3 to the other (backward) direction. In other words, the switching mechanism 14 is the stopper member 14.

As illustrated in FIG. 8, the stopper member 14 includes a pin body and a head formed in a flange shape.

The pin body has a surface 14a that comes in contact with the outer end 13b of the spiral spring 13. The surface 14a is formed in a flat shape.

The pin body further includes a position regulator 14b that protrudes from the flat surface 14a and that is disposed at a part of the flat surface 14a away from the outer end 13b of the spiral spring 13.

Figure 5:
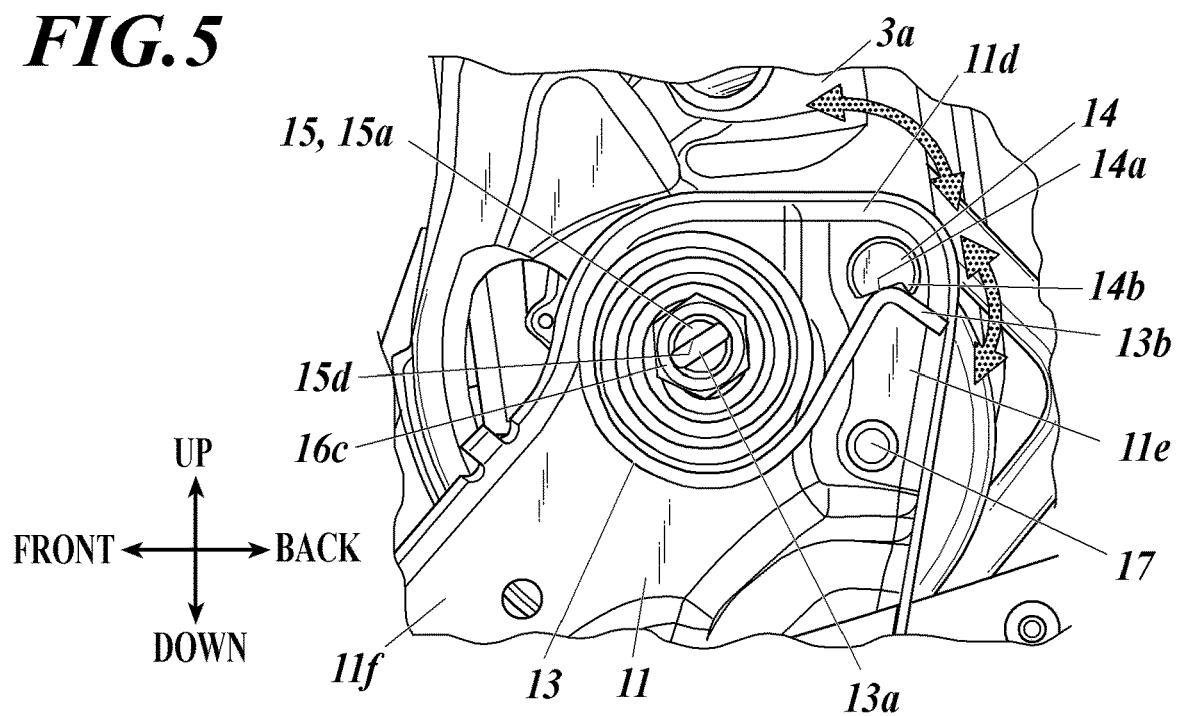
FIG. 5 is an enlarged view illustrating the state of the spiral spring when the biasing direction is backward.
Figure 6:
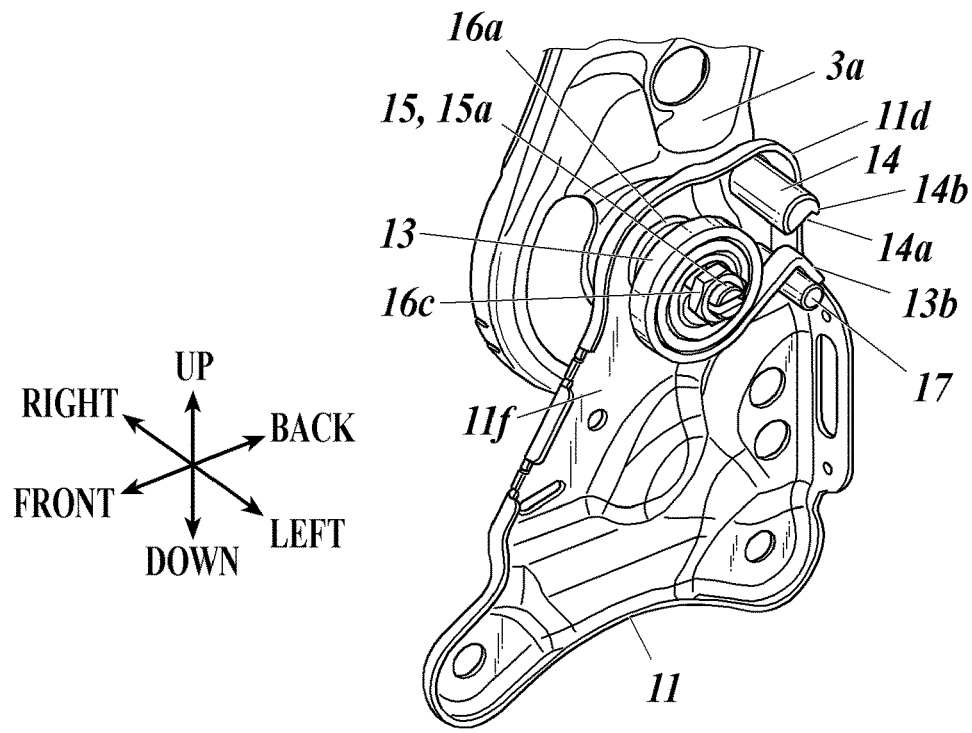
FIG. 6 is a perspective view of a main part of the reclining device.
Figure 7:
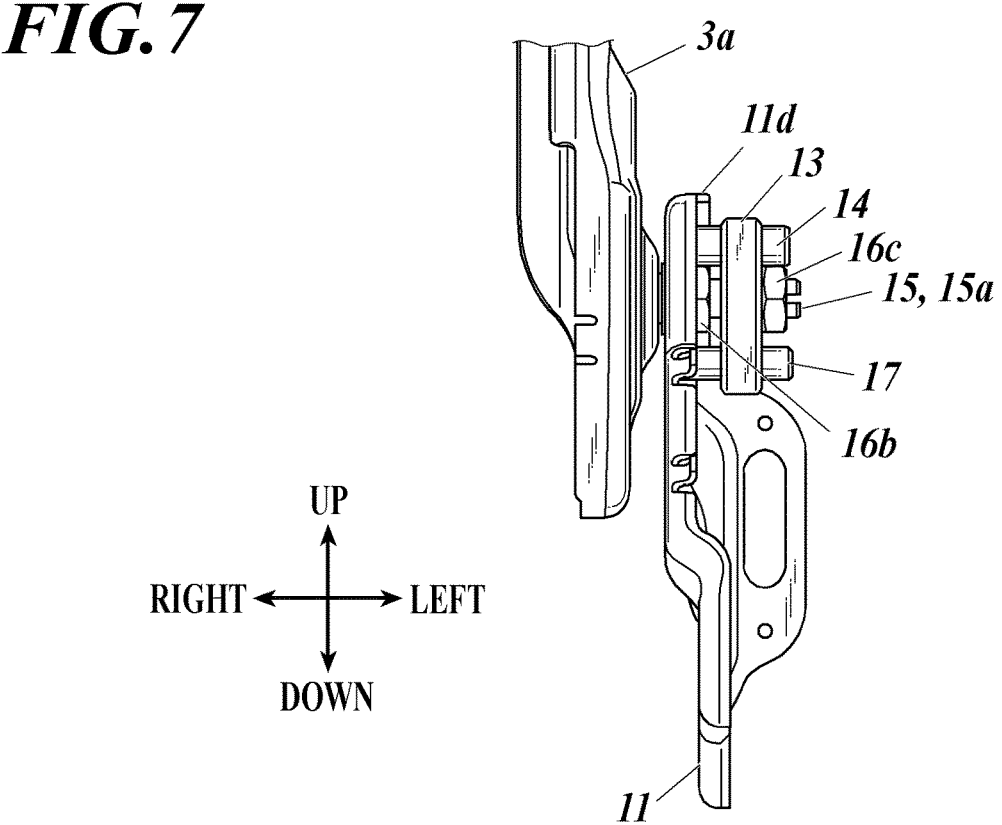
FIG. 7 is a front view of the main part of the reclining device.

The stopper member 14 including the position regulator 14 has a cylinder-based shape, and the flat surface 14a defines the shape of a cross section or the end surface of the cylindrical shape that is partly cut off (see FIG. 3, FIG. 5 etc.).

The coupling member 11 has a through hole 11c in which the stopper member 14 is inserted. The stopper member 14 is inserted in the through hole 11b from the inner side to the outer side of the coupling member 11. As illustrated in FIG. 9, the flange head is not welded to the inner surface of the coupling member 11. However, the configuration is not limited thereto. The flange head may be welded to the inner surface of the coupling member 11. The stopper member 14 is thus attached to the coupling member 11. In other words, the coupling member 11 supports the stopper member 14.

The stopper member 14 is disposed around the spiral spring 13 in any radial direction from the spiral spring. Further, the stopper 14 is disposed above the pin member 17 with a space between them. The outer end 13b of the spiral spring 13 is located between the pin member 17 and the stopper member 14. When the spiral spring 13 rotates according to the swinging movement of the seat back 3, the outer end 13b is movable between the pin member 17 and the stopper member 14.

It is preferred to reinforce the rigidity of the part around the stopper member 14 since the spiral spring 13 may sometimes sharply hit the stopper member 14. For this reason, the coupling member 11 includes a flange 11b that is disposed at least at a part above the stopper member 14 as illustrated in FIG. 3 and FIG. 5 to FIG. 9.

In the embodiment, the flange 11b is provided not only at the part above the stopper member 14 but all over the periphery of the coupling member 11. This can improve the whole rigidity of the coupling member 11.

The spiral spring 13, the stopper member 14 and the pin member 17 are attached and supported at such a position that overlaps the coupling member 11 in the seat width direction. That is, in a side view of the seat 1 as illustrated in FIG. 3 and the like, the spiral spring 13, the stopper member 14 and the pin member 17 overlap the coupling member 11. In the embodiment, the spiral spring 13, the stopper member 14 and the pin member 17 do not extend out of the coupling member 11 across the edge thereof.

The coupling member 11 further includes a bump 11e that protrudes outward in the seat width direction and a recess 11f that is recessed relative to the bump portion 11e. That is, the coupling member 11 has an uneven shape in the seat width direction. The uneven shape can improve the rigidity of the coupling member 11.

The spiral spring 13 is disposed on a part of the coupling member 11 other than the bump 11e, i.e. on the recess 11f. The stopper member 14 and the pin member 17 are disposed at the bump 11e of the coupling member 11.

Next, the movement of the seat 1 having the above-described configuration will be described.

As described above, the seat 1 is configured such that the seat back 3 is swingable from the reclined backward position A to the folded forward position C. That is, the movable range of the seat back 3 is between the position A and the position C.

In the position A of the seat back 3 as illustrated in FIG. 1 and the position of the seat back 3 as illustrated in FIG. 2, the outer end 13b of the spiral spring 13 is hooked on the pin member 17 as illustrated in FIG. 3. Accordingly, the spiral spring 13 biases the seat back 3 in the forward direction. When the locking mechanism 12 is unlocked in this state, the seat back 3 swings forward about the rotation shaft 15 at the lower end.

The weak biasing force of the spiral spring 13 or the heavy seat back 3 may slow down the speed of the seat back 3 swinging forward when the locking mechanism 12 is unlocked. In such cases, the occupant may assist the swinging movement of the seat back 3.

From the position of the seat back 3 of FIG. 2 to the position of the seat back 3 of FIG. 4, the rotation shaft 15 is rotated along with the seat back 3. Accordingly, the outer end 13b of the spiral spring 13 moves from the position hooked on the pin member 17 to the position in contact with the flat surface 14a of the stopper member 14.

When the seat back 3 swings to the position B or C in FIG. 1 while the outer end 13b of the spiral spring 13 is in contact with the surface 14a of the stopper member 14, the spiral spring 13 biases the seat back 3 in the backward direction. When the locking mechanism 12 is unlocked in this state, the seat back 3 swings backward about the rotation shaft 15 at the lower end.

The weak biasing force of the spiral spring 13 or the heavy seat back 3 may slow down the speed of the seat back 3 swinging backward when the locking mechanism 12 is unlocked. In such cases, the occupant may assist the swinging movement of the seat back 3.

When the outer end 13b of the spiral spring 13 is in contact with the flat surface 14a of the stopper member 14, as illustrated in FIG. 5, the biasing force of the spiral spring 13 is less likely to be diminished since the outer end 13b is in contact with the position regulator 14b. This can increase the biasing force of the spiral spring 13 for swinging the seat back 3 backward. In contrast, to reduce the biasing force of the spiral spring 13 when the seat back 3 swings backward, a stopper member 14 with no position regulator 14b may be used.

In view of the movement of the seat 1 as described above, the stopper member 14 functions as a switching mechanism that switches the biasing direction of the spiral spring 13 for the seat back 3 from forward to backward in the middle of the swinging movement of the seat back 3. Further, the pin member 17 functions as the switching mechanism that switches the biasing direction of the spiral spring 13 for the seat back 3 from backward to forward in the middle of the swinging movement of the seat back 3.

In the embodiment, the switching mechanism, which may either be composed of only the stopper member 14 or further include the pin member 17, and the single spiral spring 13 are used to switch the biasing direction for the seat back 3 in the middle of the swinging movement of the seat back 3. However, the configuration is not limited thereto, and any other auxiliary biasing member may be used in combination.

An example of such other biasing members is an additional spiral spring 18 that is disposed at a right side surface (i.e. a side surface on the opposite side) of the seat 1 as illustrated in FIG. 10. As with the spiral spring 13, the additional spiral spring 18 is held by a rotation shaft (not shown in the figure) at the right side surface, which produces a biasing force according to the swinging movement of the seat back 3.

The biasing direction of the additional spiral spring 18 in FIG. 10 for the seat back 3 is in the opposite direction from the biasing direction of the spiral spring 13 disposed at the left side surface of the seat for the seat back 3. Accordingly the additional spiral spring can cancel the biasing force of the spiral spring 13 to reduce the swing speed of the seat back 3. The biasing force of the additional spiral spring 18 itself is weaker than the biasing force of the spiral spring 13. However, the biasing force of the additional spiral spring 18 may be suitably selected.

Alternatively, in order to increase the swing speed of the seat back 3, the additional spiral spring 18 for the seat back 3 may have the same biasing direction with the spiral spring 13 at the left side surface of the seat for the seat back 3.

The configuration is not limited to the example in FIG. 10. An additional spiral spring that produces the opposite biasing force from the spiral spring 13 of the embodiment may be disposed adjacent to the spiral spring 13. That is, the rotation shaft 15 holds the spiral spring 13 and the additional spiral spring having the opposite biasing force (opposite winding direction) that are disposed side by side with each other. As with the spiral spring 13, the additional spiral spring comes in contact with the stopper member 14 and the pin member 17 so as to be able to switch the biasing direction for the seat back 3, which is in the opposite to the biasing direction of the spiral spring 13.

In summary, at least the spiral spring 13 is used as the biasing member in the embodiment, and an additional spiral spring (additional biasing member) as described above may be used in combination with the spiral spring 13. This is preferable since it becomes possible to adjust the swing speed of the seat back 3 by suitably adjusting or changing the biasing force and the biasing direction of the additional spiral spring.

According to the above-described embodiment, the seat 1 includes the reclining device 10 that couples the seat back 3 to the seat cushion 2 in a swingable manner in one and the other directions. The reclining device 10 includes the locking mechanism 12 that locks or unlocks the swinging movement of the seat back 3, the biasing member 13 that biases the seat back 3 in the one direction to swing the seat back 3 in the one direction when the locking mechanism 12 is unlocked, and a switching mechanism 14 (17) that switches the biasing direction of the biasing member 13 for the seat back 3 to the other direction in the middle of the swinging movement of the seat back 3. Accordingly, the switching mechanism 14 (17) can impart a biasing function of biasing the seat back 3 in the other direction to the biasing member 13 that biases the seat back 3 in the one direction. This can suppress an increase in the number of parts and reduce the swing speed of the seat back 3 with the simple structure.

The biasing member 13 is constituted by the spiral spring 13 with the inner end 13a and the outer end 13b. The switching mechanism 14 includes the stopper member 14 that comes in contact with the outer end 13b of the spiral spring 13 so as to switch the biasing direction of the seat back 3 to the other direction in the middle of the swinging movement of the seat back 3 in the one direction. The stopper member 14 is disposed around the spiral spring 13 in any radial direction from the spiral spring. This allows the simple structure and the compact arrangement of the stopper member 14 as the switching mechanism.

The reclining device 10 is disposed at the end of the seat cushion 2 where the seat back 3 is supported. The reclining device 10 further includes the coupling member 11 that couples the seat cushion 2 to the seat back 3. The coupling member 11 supports the stopper member 14 and the spiral spring 13. This allows the common use of a part to attach the stopper 14 and the spiral spring 13, and it is not necessary to provide individual parts. This can suppress an increase in the number of parts.

The coupling member 11 includes the flange 11d that is disposed at least at a part above the stopper member 14. This can improve at least the rigidity of the coupling member 11 supporting the stopper member 14.

The coupling member 11 includes a bump 11e that protrudes outward in the seat width direction. The spiral spring 13 and the stopper member 14 are attached and supported at a position that overlaps the coupling member 11 in the seat width direction. The spiral spring 13 is disposed at a part of the coupling member 11 other than the bump 11e. The stopper member 14 is disposed at the bump 11e of the coupling member 11. This allows the compact arrangement of the spiral spring 13 in the seat width direction and can improve the rigidity of supporting the stopper member 14.

The surface 14a of the stopper member 14 that comes in contact with the outer end 13b of the spiral spring 13 is formed in a flat shape. This can increase the area that can contact the outer end 13b of the spiral spring 13.

The stopper member 14 includes the flat surface 14a that comes in contact with the outer end 13b of the spiral spring 13, and the position regulator 14b that protrudes from the flat surface 14a and that is disposed at a part of the flat surface 14a away from the outer end 13b of the spiral spring 13. This can prevent the outer end 13b of the spiral spring 13 in contact with the flat surface 14a of the stopper member 14 from sliding.

Variation

The embodiments of the present invention are not limited to the above-described embodiment, and suitable changes can be made without departing from the features of the present invention. Hereinafter, a variation will be described. The following variation may be combined as much as possible.

Figure 11:
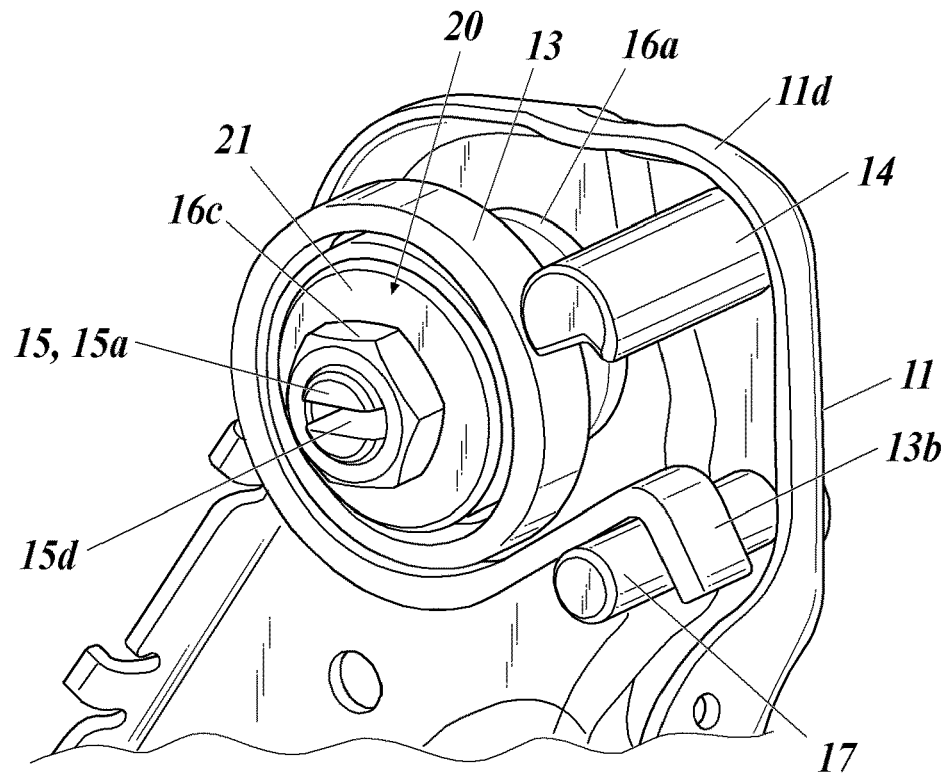
FIG. 11 is a perspective view of a holder member from below.
Figure 12:
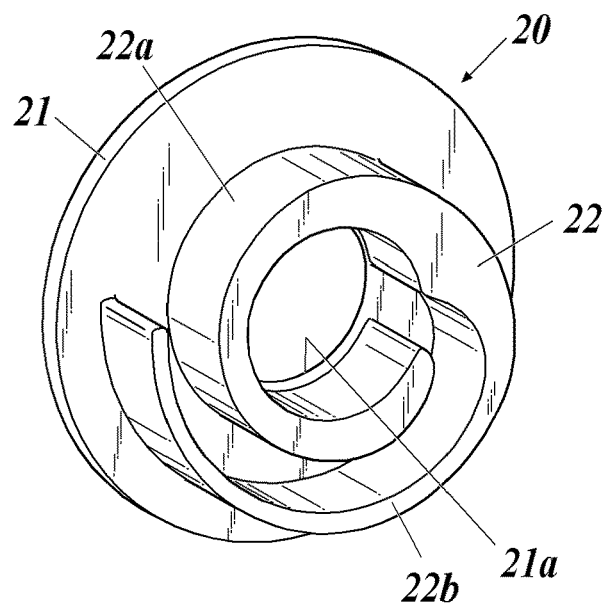
FIG. 12 is a perspective view of the holder member attached to the spiral spring.
Figure 13:
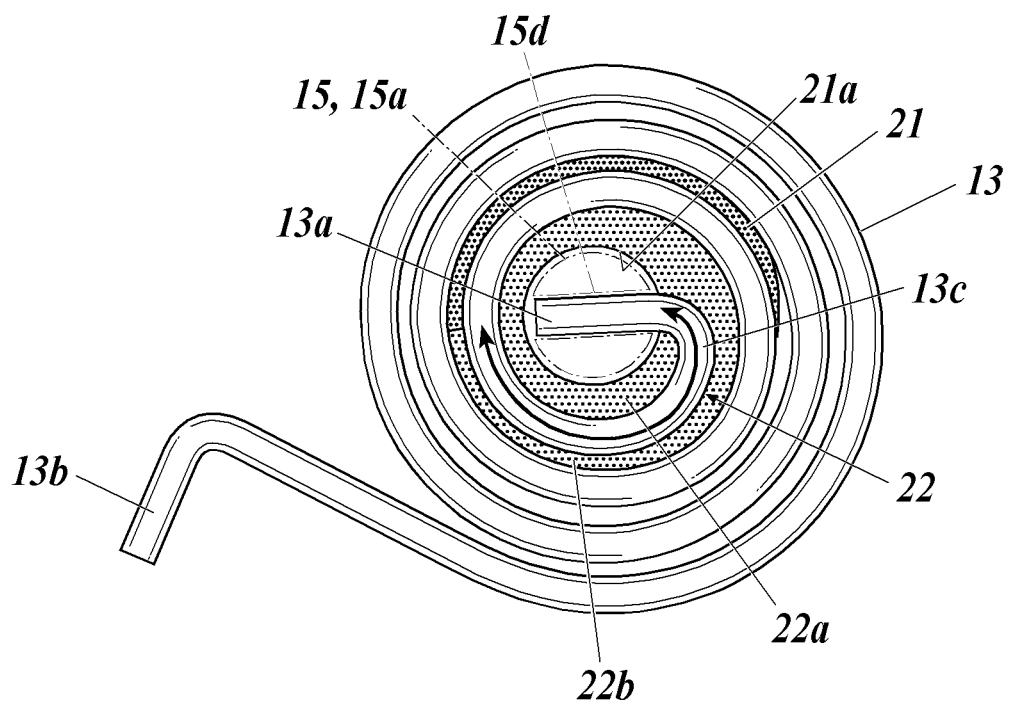
FIG. 13 is a perspective view from below of the holder member attached to the spiral spring.

In the variation, a holder member 20 for preventing the spiral spring 13 from fracture is provided around the inner end 13a of the spiral spring 13 and along the spring body of the spiral spring 13 as illustrated in FIG. 11 to FIG. 13.

The inner end 13a of the spiral spring 13 is inserted in the slit 15d of the shaft body 15a of the rotation shaft 15. As described above, the inner end 13a is folded to form a corner-like portion. The portion thus folded (hereinafter referred to as a folded portion 13c) is in contact with an edge of the slit 15d of the shaft body 15a. Accordingly, when the spiral spring 13 biases the seat back 3 in one (forward) direction or in the other (backward) direction by the stopper member 14, the load is concentrated in the folded portion 13c.

The holder member 20 is disposed around the inner end 13a of the spiral spring 13 as illustrated in FIG. 11 in order to prevent the folded portion 13c of the spiral spring 13 from fracture, which is subjected to a concentrated load as described above.

The holder member 20, which is formed in a shape corresponding to the spiral shape of the spiral spring 13, includes a flange 21 and a socket 22. In the variation, the flange 21 and the socket 22 are integrally formed. However, they may be joined by welding or the like.

The holder 20 is made of metal such as iron or resin such as polyolefin.

As illustrated in FIG. 11 and FIG. 12, the flange 21 is a plate member formed in a ring shape with a hole 21a at the center. The flange 21 is disposed in contact with the outer side of the spiral spring 13. That is, the back surface (the surface shown in FIG. 12) of the flange 21 is in contact with the outer side surface of the spiral spring 13.

In the center hole 21a, the shaft body 15a of the rotation shaft 15 is inserted. As illustrated in FIG. 11, a nut 16c is disposed on the shaft body 15a so that the flange 21 is attached on the outer side of the spiral spring 13.

As illustrated in FIG. 12 and FIG. 13, the socket 22 protrudes from the surface (above-described back surface) facing the spiral spring 13 of the flange 21 into a gap of the spiral spring 13 so as to be inserted in the gap of the spiral spring 13. The socket 22 includes a center part 22a and an extended part 22b.

The center part 22a is disposed along the edge of the hole 21a of the flange 21 and formed in an approximately C-shape. Inside the approximately C-shaped center part 22a, the shaft body 15a is inserted, and the inner end 13a of the spiral spring 13 is inserted in the slit 15d of the shaft body 15a.

The extended part 22b extends in a semicircular arc shape along the spiral spring 13 from an end of the center part 22a. The extended part 22b is thus inserted in the gap of the spiral spring 13.

In more detail, as illustrated in FIG. 13, the center part 22a and the extended part 22b are disposed along and in contact with the innermost circle (circular part of about 360 degrees from the folded portion 13c) of the spring body of the spiral spring 13. The extended part 22b is also in contact with the next circle of the spring body continuing from the innermost circle.

Accordingly, the center part 22a and the extended part 22b have such a positional relationship that a part (semicircular arc of about 180 degrees from the folded portion 13c) of the innermost circle of the spring body of the spiral spring 13 is sandwiched in the center part 22a and the extended part 22b.

In the variation, the holder member 20 is disposed around the inner end 13a of the spiral spring 13 along the spring body of the spiral spring 13. This facilitates dispersion of the load on the folded portion 13c of the spiral spring 13 to the holder member 20 in contact with the spring body of the spiral spring 13. As a result, the holder member 20 can prevent the folded portion 13c of the spiral spring 13 from fracture.

The embodiments disclosed herein are merely examples and not intended as limitations in any respect. The scope of the present invention is defined not by the above description but by the claims and is intended to encompass all changes made within the claims and the equivalents thereof.

What is claimed is:

1. A seat comprising:
   a seat back;
   a seat cushion; and
   a reclining device that couples the seat back to the seat cushion in a swingable manner in a first direction and a second direction, the reclining device including:
   a locking mechanism that locks and unlocks swinging movement of the seat back;
   a biasing member that includes a spiral spring with an inner end and an outer end, the biasing member being configured to bias the seat back in the first direction so as to swing the seat back in the first direction when the locking mechanism is unlocked; and
   a switching mechanism that switches a biasing direction of the biasing member for the seat back to a second direction in a middle of the swinging movement of the seat back, the switching mechanism including a stopper member disposed around the spiral spring in a radial direction of the spiral spring, the stopper member having a flat surface configured to contact the outer end of the spiral spring in the middle of the swinging movement of the seat back in the first direction to switch the biasing direction of the biasing member to the second direction.

2. The seat according to claim 1, wherein:
   wherein the reclining device further includes a coupling member that is disposed at an end of the seat cushion where the seat back is supported and the coupling member couples the seat back to the seat cushion, and
   wherein the coupling member supports the stopper member and the spiral spring.

3. The seat according to claim 2, wherein the coupling member includes a flange that is disposed at least partially above the stopper member.

4. The seat according to claim 2, wherein:
   the coupling member includes a bump that protrudes outward in a seat width direction,
   the spiral spring and the stopper member are attached to and supported by the coupling member at a position that overlaps the coupling member in the seat width direction,
   the spiral spring is disposed at a part of the coupling member other than the bump, and
   the stopper member is disposed at the bump of the coupling member.

5. The seat according to claim 1, wherein the stopper member includes:
   a position regulator that protrudes from the flat surface and the position regulator is disposed at a part of the flat surface away from the outer end of the spiral spring.

6. A seat comprising:
   a seat back;
   a seat cushion; and
   a reclining device that couples the seat back to the seat cushion in a swingable manner in a first direction and a second direction, the reclining device including:
   a locking mechanism that locks and unlocks swinging movement of the seat back;
   a biasing member that includes a spiral spring with an inner end and an outer end, the biasing member being configured to bias the seat back in the first direction so as to swing the seat back in the first direction when the locking mechanism is unlocked;
   a switching mechanism that switches a biasing direction of the biasing member for the seat back to a second direction in a middle of the swinging movement of the seat back, the switching mechanism including a stopper member disposed around the spiral spring in a radial direction of the spiral spring, the stopper member being configured to contact the outer end of the spiral spring in the middle of the swinging movement of the seat back in the first direction to switch the biasing direction of the biasing member to the second direction; and
   a coupling member including a bump that protrudes outward in a seat width direction, the coupling member being disposed at an end of the seat cushion where the seat back is supported, the coupling member coupling the seat back to the seat cushion, and the coupling member supporting the stopper member and the spiral spring, wherein:
   the spiral spring and the stopper member are attached to and supported by the coupling member at a position that overlaps the coupling member in the seat width direction,
   the spiral spring is disposed at a part of the coupling member other than the bump, and
   the stopper member is disposed at the bump of the coupling member.

7. The seat according to claim 6, wherein the coupling member includes a flange that is disposed at least partially above the stopper member.

8. The seat according to claim 6, wherein the stopper member includes a flat surface configured to contact with the outer end of the spiral spring.

9. The seat according to claim 6, wherein the stopper member includes:
   a flat surface configured to contact the outer end of the spiral spring; and
   a position regulator that protrudes from the flat surface and the position regulator is disposed at a part of the flat surface away from the outer end of the spiral spring.

10. A method for producing a seat comprising:
providing the seat that comprises:
- a seat back;
- a seat cushion; and
- a reclining device that couples the seat back to the seat cushion in a swingable manner in a first direction and a second direction, the reclining device including:
  - a locking mechanism that locks and unlocks swinging movement of the seat back;
  - a biasing member that includes a spiral spring with an inner end and an outer end, the biasing member being configured to bias the seat back in the first direction so as to swing the seat back in the first direction when the locking mechanism is unlocked; and
  - a switching mechanism that switches a biasing direction of the biasing member for the seat back to a second direction in a middle of the swinging movement of the seat back, the switching mechanism including a stopper member disposed around the spiral spring in a radial direction of the spiral spring, the stopper member having a flat surface configured to contact the outer end of the spiral spring in the middle of the swinging movement of the seat back in the first direction to switch the biasing direction of the biasing member to the second direction.

11. The method according to claim 10, wherein the reclining device further includes a coupling member that is disposed at an end of the seat cushion where the seat back is supported and the coupling member couples the seat back to the seat cushion, the coupling member supporting the stopper member and the spiral spring.

12. The method according to claim 11, wherein the coupling member includes a flange that is disposed at least in part above the stopper member.

13. The method according to claim 11, wherein:
- the coupling member includes a bump that protrudes outward in a seat width direction,
- the spiral spring and the stopper member are attached to and supported by the coupling member at a position that overlaps the coupling member in the seat width direction,
- the spiral spring is disposed at a part of the coupling member other than the bump, and
- the stopper member is disposed at the bump of the coupling member.

14. The method according to claim 10, wherein the stopper member includes a position regulator that protrudes from the flat surface and the position regulator is disposed at a part of the flat surface away from the outer end of the spiral spring.

* * * * *